F. C. SIMON.
WHEELED SLED.
APPLICATION FILED DEC. 27, 1912.
1,086,945.
Patented Feb. 10, 1914.
2 SHEETS—SHEET 1.
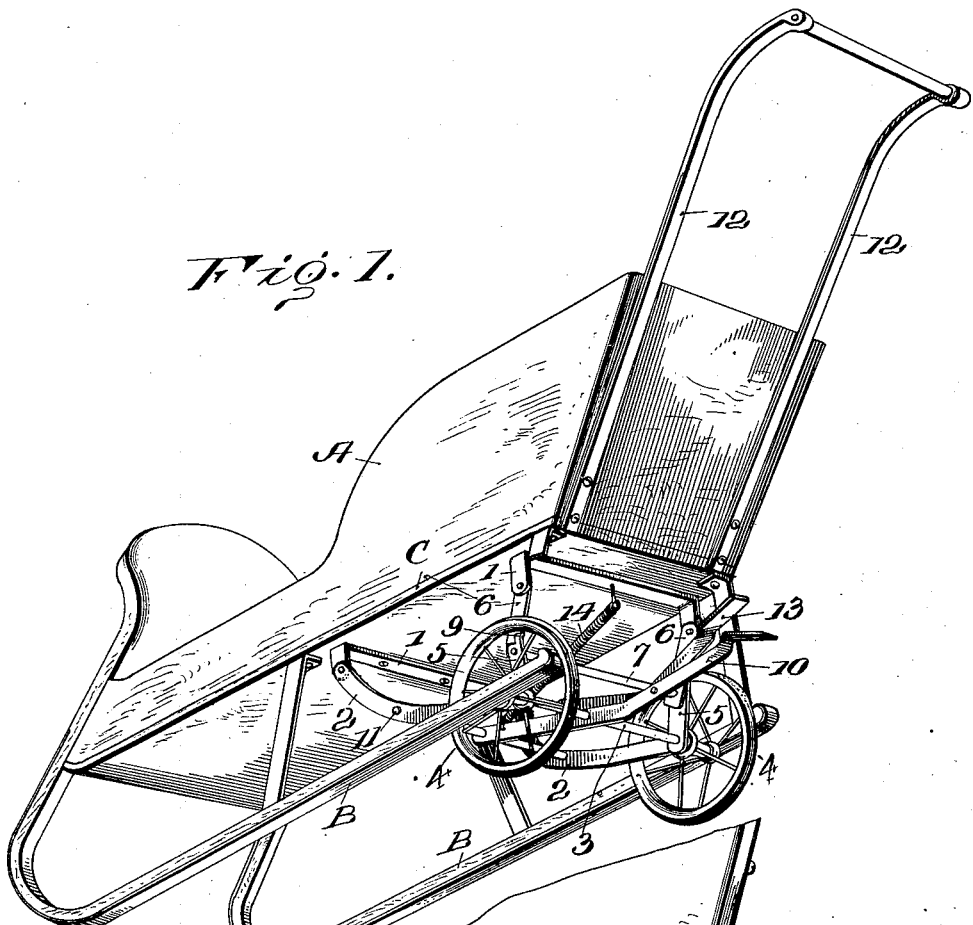
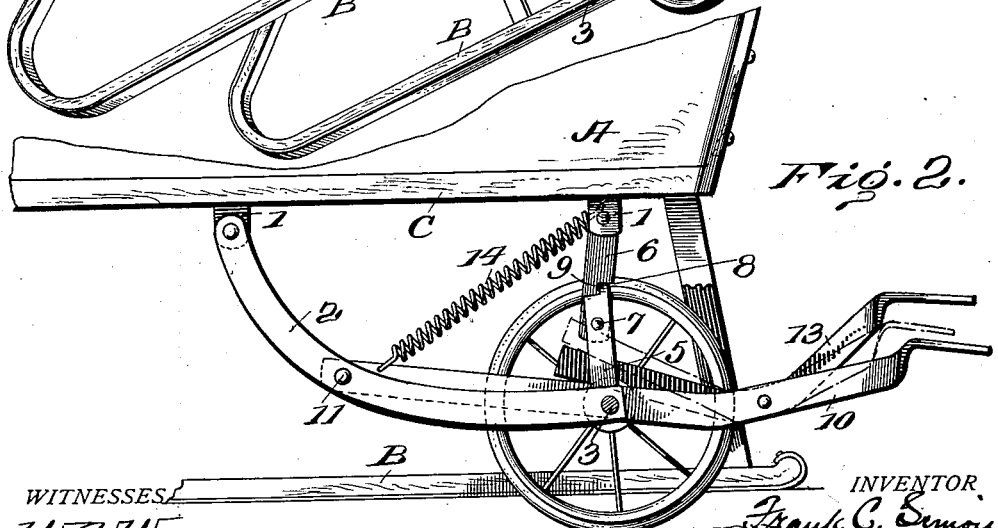
WITNESSES
W. A. Williams
Lloyd W. Patch
INVENTOR
Frank C. Simon
By Louis Bagger & Co.
Attorneys

F. C. SIMON.
WHEELED SLED.
APPLICATION FILED DEC. 27, 1912.

1,086,945.

Patented Feb. 10, 1914.
2 SHEETS—SHEET 2.

WITNESSES
W. A. Williams
Lloyd W. Patch

INVENTOR
Frank C. Simon
By Louis Baggs
Attorneys

UNITED STATES PATENT OFFICE.

FRANK C. SIMON, OF HORNELL, NEW YORK.

WHEELED SLED.

1,086,945.  Specification of Letters Patent.  Patented Feb. 10, 1914.

Application filed December 27, 1912. Serial No. 738,843.

*To all whom it may concern:*

Be it known that I, FRANK C. SIMON, a citizen of the United States, residing at Hornell, in the county of Steuben and State of New York, have invented certain new and useful Improvements in Wheeled Sleds, of which the following is a specification.

My invention relates to an improvement in wheeled sleds, and the object is to provide means whereby the wheels can be lowered and the runners of the sleigh raised when there is poor traveling for a sleigh.

The invention consists of certain novel features of construction and combinations of parts which will be hereinafter described and pointed out in the claim.

Figure 3:
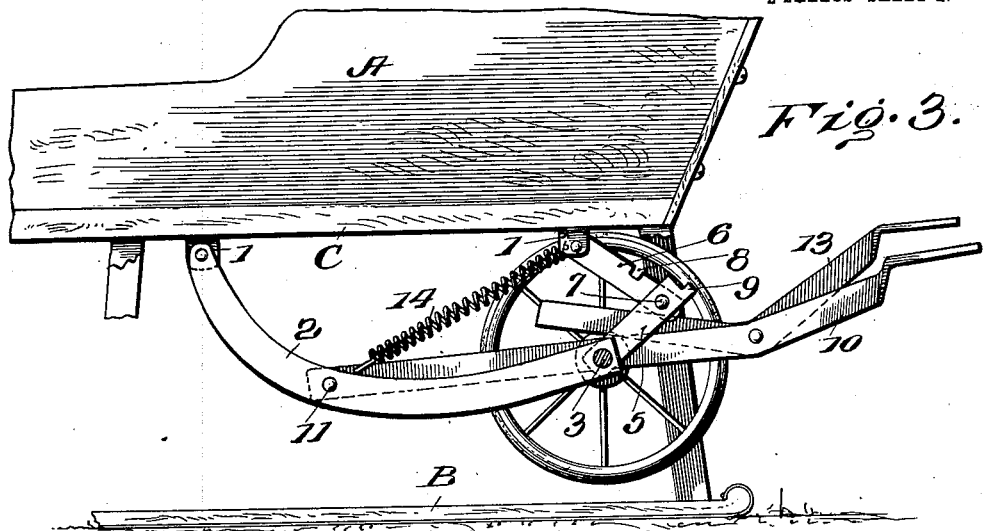
Figure 4:
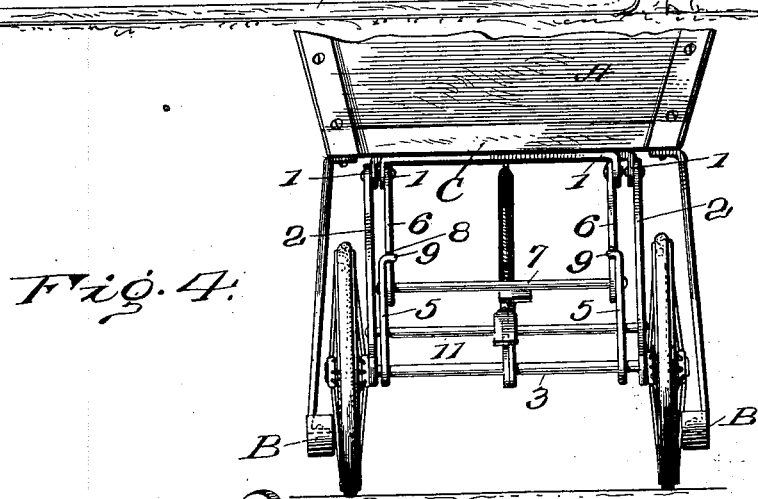
Figure 5:
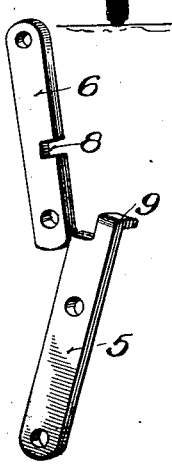

In the accompanying drawings:—Figure 1 is a perspective view of a sleigh showing the invention applied thereto: Fig. 2 is a view in side elevation of the attachment with one of the wheels removed: Fig. 3 is an enlarged detail view showing the operation of the levers: Fig. 4 is an end elevation: Fig. 5 is an enlarged detail sectional view showing the manner of connecting the links together.

A, represents the body of the sled or sleigh, and B are the runners. A block C is preferably fastened to the bottom of the body and connected to the block are brackets 1, 1 to which brackets are connected curved bars 2, 2. An axle 3 is connected to the pivoted bars 2, and rotatably mounted on the axle are wheels 4, 4. Links 5, 5 are pivotally connected to the axle 3. Links 6, 6 are pivotally connected to one of the brackets 1, and are connected at their other terminals to a rod 7 carried by the links 5. The links 6 are provided with notches 8, 8 in which lugs 9, 9 of the links 5 are received for locking the links together when in their upright position for holding the wheels 4 in contact with the earth, when the wheels are to be used and the runners B raised. The links 5 and 6 when connected together for holding the wheels in the lowermost position are not perpendicular, but are a little off center at their connecting ends so that they are securely fastened together.

A foot lever 10 is connected to the axle 3 and to a rod 11 which connects the bars 2 together. This lever is adapted to be engaged by the foot, and the handles 12 of the sleigh are engaged by the hands, and by raising or pulling upward on the handles and pressing downward on the lever 10 the wheels 4 are forced downward to their lowermost position. When it is desired to raise the wheels and lower the runners, a lever 13 which is pivotally connected to the lever 10 is actuated causing it to engage the rod 7 to which the links 5 and 6 are connected, for tripping the rod or throwing it rearward causing the links to become disengaged, thereby causing the wheels to move upward and into engagement with the bottom of the body of the sleigh.

A spring 14 is connected to one of the braces 1 and to the forward end of the lever 10 for forcing the wheels upward upon the actuation of the rod which causes the breaking of the engagement between the links 5 and 6.

From the foregoing it will be seen that the vehicle can be used as a sleigh or a carriage as the occasion demands, by simply manipulating the lever 10 for bringing the wheels to their lowermost position when the vehicle is to be used as carriage; and when used as sleigh the lever 13 is actuated for causing the wheels to be raised to the uppermost position.

Having fully described my invention, what I claim as new and desire to secure by Letters Patent, is:—

The combination with a sleigh body and runners, of an axle, bars pivoted to the body, to the free ends of which the axle is connected, wheels rotatably mounted on the axle, a rod extending across and connecting the pivoted bars, two pairs of links, a rod extending across and pivotally connecting these links together, said links pivotally connected to the body and to the axle, a foot-lever connected to the rod which connects the pivoted bars and to the axle, a lever pivoted to the foot-lever with one end in position to engage the rod which connects the links, and a spring which normally suspends the pivoted bars, the wheels, levers and links.

In testimony whereof I affix my signature, in the presence of two witnesses.

FRANK C. SIMON.

Witnesses:
 MARTIN J. MILLER,
 WILLIAM J. CUNNINGHAM.

Copies of this patent may be obtained for five cents each, by addressing the "Commissioner of Patents, Washington, D. C."